(12) United States Patent
Bohn

(10) Patent No.: US 10,909,902 B2
(45) Date of Patent: Feb. 2, 2021

(54) DISPLAY SYSTEM WITH A SINGLE PLATE OPTICAL WAVEGUIDE AND INDEPENDENTLY ADJUSTABLE MICRO DISPLAY ARRAYS

(71) Applicant: Microsoft Technology Licensing, LLC, Redmond, WA (US)

(72) Inventor: David D. Bohn, Fort Collins, CO (US)

(*) Notice: Subject to any disclaimer, the term of this patent is extended or adjusted under 35 U.S.C. 154(b) by 0 days.

(21) Appl. No.: 16/703,923

(22) Filed: Dec. 5, 2019

(65) Prior Publication Data

US 2020/0111402 A1 Apr. 9, 2020

Related U.S. Application Data

(63) Continuation of application No. 16/016,366, filed on Jun. 22, 2018, now Pat. No. 10,546,523.

(51) Int. Cl.
*G02B 27/01* (2006.01)
*G09G 3/20* (2006.01)
*F21V 8/00* (2006.01)
*G09G 3/32* (2016.01)

(52) U.S. Cl.
CPC ........... *G09G 3/2003* (2013.01); *G02B 6/005* (2013.01); *G02B 6/0026* (2013.01); *G02B 27/0172* (2013.01); *G09G 3/32* (2013.01); *G02B 6/003* (2013.01); *G02B 2027/0112* (2013.01); *G02B 2027/0178* (2013.01); *G09G 2320/0242* (2013.01); *G09G 2320/0666* (2013.01)

(58) Field of Classification Search
CPC .................. G09G 3/2003; G09G 3/32; G09G 2320/0242; G09G 2320/0666; G02B 6/0026; G02B 6/005; G02B 27/0172; G02B 6/003; G02B 2027/0112; G02B 2027/0178; G02B 27/0081; G02B 2027/0116
See application file for complete search history.

(56) References Cited

U.S. PATENT DOCUMENTS

| | | | | |
|---|---|---|---|---|
| 10,067,347 | B2* | 9/2018 | Vallius | G02B 27/4205 |
| 10,156,725 | B2* | 12/2018 | Tekolste | G02B 6/0026 |
| 10,281,726 | B2* | 5/2019 | Vallius | G02B 27/0172 |
| 10,345,519 | B1* | 7/2019 | Miller | G02B 6/122 |
| 10,451,947 | B1* | 10/2019 | Lu | G06F 1/163 |
| 2010/0284180 | A1* | 11/2010 | Popovich | G02B 27/102 |
| | | | | 362/231 |

(Continued)

*Primary Examiner* — Ibrahim A Khan
(74) *Attorney, Agent, or Firm* — Ranjeev Singh; Singh Law, PLLC

(57) ABSTRACT

Display systems with a single plate optical waveguide and independently adjustable micro display arrays and related methods are provided. A method includes coupling: a first light portion received from the first micro display array to a first input grating region of the optical waveguide, a second light portion received from the second micro display array to a second input grating region of the optical waveguide, and a third light portion received from the third micro display array to a third input grating region of the optical waveguide. The method further includes directing: a first diffracted portion of the first light portion to a first expansion grating, a second diffracted portion of the second light portion to a second expansion grating, and a third diffracted portion of the third light portion to a third expansion grating. The method further includes using a single output grating outputting combined light.

20 Claims, 5 Drawing Sheets

(56) References Cited

U.S. PATENT DOCUMENTS

| | | | | |
|---|---|---|---|---|
| 2011/0242661 | A1* | 10/2011 | Simmonds | G02B 27/0101 |
| | | | | 359/567 |
| 2012/0218481 | A1* | 8/2012 | Popovich | G02B 5/1842 |
| | | | | 349/11 |
| 2013/0044376 | A1* | 2/2013 | Valera | G02B 27/0101 |
| | | | | 359/567 |
| 2014/0204455 | A1* | 7/2014 | Popovich | G02B 6/0028 |
| | | | | 359/316 |
| 2015/0125109 | A1* | 5/2015 | Robbins | G02B 27/0172 |
| | | | | 385/10 |
| 2016/0377871 | A1* | 12/2016 | Kress | G02B 27/0172 |
| | | | | 359/567 |
| 2016/0379606 | A1* | 12/2016 | Kollin | G06T 3/4038 |
| | | | | 345/428 |
| 2018/0231771 | A1* | 8/2018 | Schuck, III | G02B 6/0016 |
| 2018/0292713 | A1* | 10/2018 | Drolet | G02B 6/005 |
| 2019/0041657 | A1* | 2/2019 | Amitai | G02B 27/4205 |
| 2019/0113829 | A1* | 4/2019 | Waldern | G02B 27/0172 |
| 2019/0121027 | A1* | 4/2019 | Popovich | G02B 27/017 |
| 2019/0235252 | A1* | 8/2019 | Freedman | G06F 3/011 |

* cited by examiner

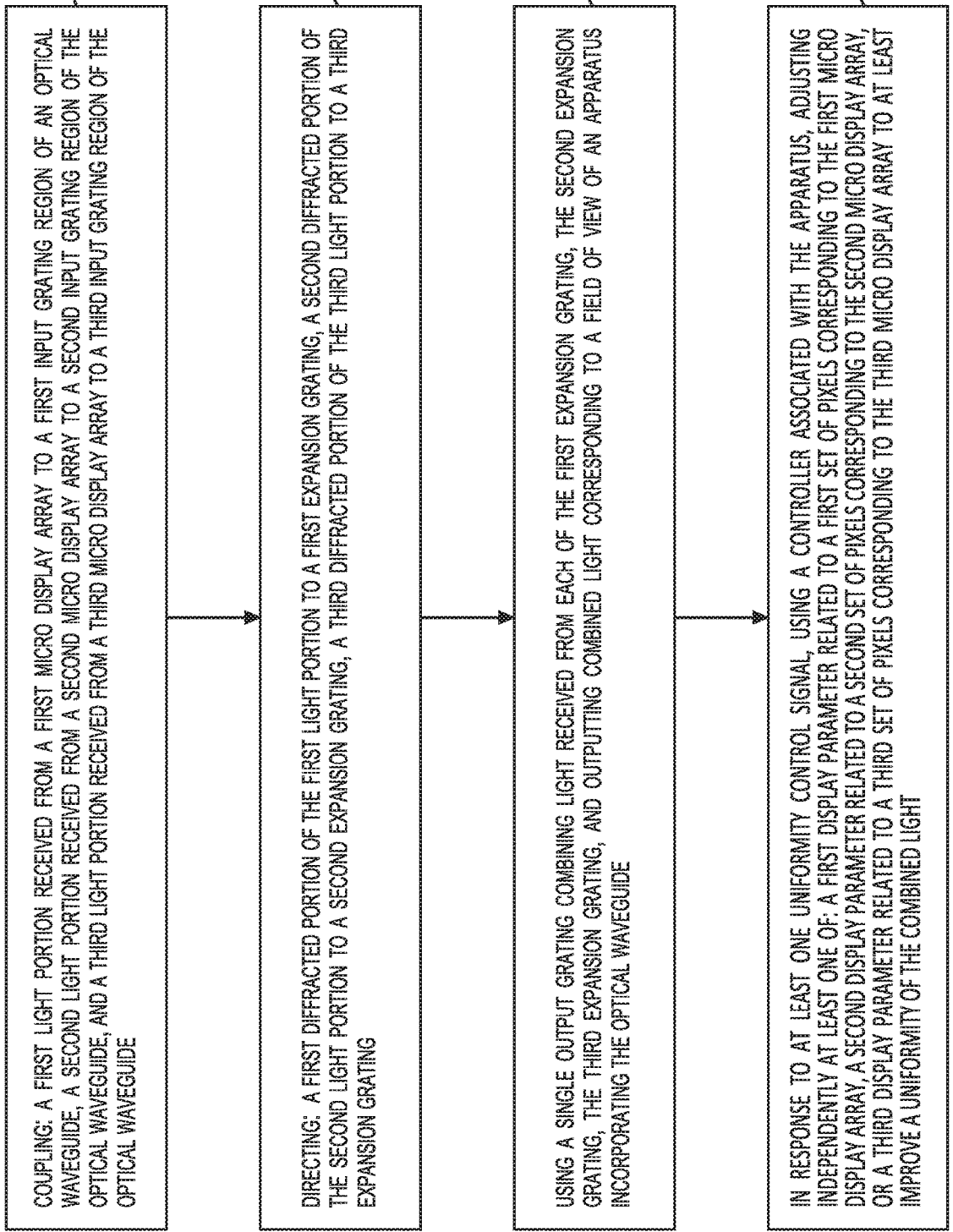

US 10,909,902 B2

DISPLAY SYSTEM WITH A SINGLE PLATE OPTICAL WAVEGUIDE AND INDEPENDENTLY ADJUSTABLE MICRO DISPLAY ARRAYS

CROSS-REFERENCE TO RELATED APPLICATION(S)

This application is a continuation of U.S. patent application Ser. No. 16/016,366, filed on Jun. 22, 2018, entitled "DISPLAY SYSTEM WITH A SINGLE PLATE OPTICAL WAVEGUIDE AND INDEPENDENTLY ADJUSTABLE MICRO DISPLAY ARRAYS," the entire contents of which are hereby incorporated herein by reference.

BACKGROUND

Display systems, including virtual reality systems, allow a user to visualize digital worlds. Mixed reality systems bring people, places, and objects from both physical and digital worlds together. As an example, a mixed reality system may allow a user to interact with virtual objects, including holograms and thus enabling a user of the system to visualize and work with digital content as part of the real world. Users may drag and drop holograms as part of their view of the real world.

Virtual and mixed reality systems can be implemented using head mounted displays that can project the virtual digital content in front of the user's eyes. Many such systems include a waveguide for coupling light signals received from light sources for display to the user of the display system.

SUMMARY

In one example, the present disclosure relates to an apparatus comprising a first micro display array corresponding to a red color channel, a second micro display array corresponding to a green color channel, and a third micro display array corresponding to a blue color channel. The apparatus may further include an optical waveguide including a first surface and a second surface opposite to the first surface. The optical waveguide may further include a first input grating region configured to receive a first light portion corresponding to the red color channel, a second input grating region configured to receive a second light portion corresponding to the blue color channel, where the second input grating region is offset from the first input grating region by a first offset, and a third input grating region configured to receive a third light portion corresponding to the green color channel, where the third input grating region is offset from the second input grating region by a second offset.

The optical waveguide may further include a first set of expansion gratings, formed on the first major surface of the optical waveguide, configured to receive a first diffracted light portion of the first light portion from the first input grating region, a second set of expansion gratings, formed on the first major surface of the optical waveguide, configured to receive a second diffracted light portion of the second light portion from the second input grating region, and a third set of expansion gratings, formed on the second major surface of the optical waveguide, configured to receive a third diffracted light portion of the third light portion from the third input grating region.

In another example, the present disclosure relates to an apparatus comprising a first micro display array corresponding to a red color channel, a second micro display array corresponding to a green color channel, and a third micro display array corresponding to a blue color channel. The apparatus may further include an optical waveguide including a first surface and a second surface opposite to the first surface. The optical waveguide may further include a first input grating region configured to receive a first light portion corresponding to the red color channel, a second input grating region configured to receive a second light portion corresponding to the blue color channel, where the second input grating region is offset from the first input grating region by a first offset, and a third input grating region configured to receive a third light portion corresponding to the green color channel, where the third input grating region is offset from the second input grating region by a second offset.

The optical waveguide may further include a first expansion grating, formed on the first major surface of the optical waveguide, configured to receive a first diffracted light portion of the first light portion from the first input grating region, a second expansion grating, formed on the first major surface of the optical waveguide, configured to receive a second diffracted light portion of the second light portion from the second input grating region, and a third expansion grating, formed on the second major surface of the optical waveguide, configured to receive a third diffracted light portion of the third light portion from the third input grating region. The optical waveguide may further include an output grating configured to combine light received from each of the first expansion grating, the second expansion grating, and the third expansion grating to generate combined light corresponding to a field of view of the apparatus and output combined light out of the optical waveguide.

In another example, the present disclosure relates to a method in an apparatus comprising a display controller, an optical waveguide, a first micro display array, a second micro display array, and a third micro display array. The method may include coupling: a first light portion received from the first micro display array to a first input grating region of the optical waveguide, a second light portion received from the second micro display array to a second input grating region of the optical waveguide, and a third light portion received from the third micro display array to a third input grating region of the optical waveguide. The method may further include directing: a first diffracted portion of the first light portion to a first expansion grating, a second diffracted portion of the second light portion to a second expansion grating, and a third diffracted portion of the third light portion to a third expansion grating. The method may further include using a single output grating combining light received from each of the first expansion grating, the second expansion grating, the third expansion grating, and outputting combined light corresponding to a field of view of an apparatus incorporating the optical waveguide. The method may further include, in response to at least one uniformity control signal, using a controller associated with the apparatus, adjusting independently at least one of: a first display parameter related to a first set of pixels corresponding to the first micro display array, a second display parameter related to a second set of pixels corresponding to the second micro display array, or a third display parameter elated to a third set of pixels corresponding to the third micro display array to at least improve a uniformity of the combined light.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 1 shows a diagram of an optical waveguide in accordance with one example;

FIG. 5 shows a flow chart showing steps of a method related to an apparatus incorporating the optical waveguide of FIG. 1, display system 200, and system 400 in accordance with one example.

DETAILED DESCRIPTION

Figure 1:
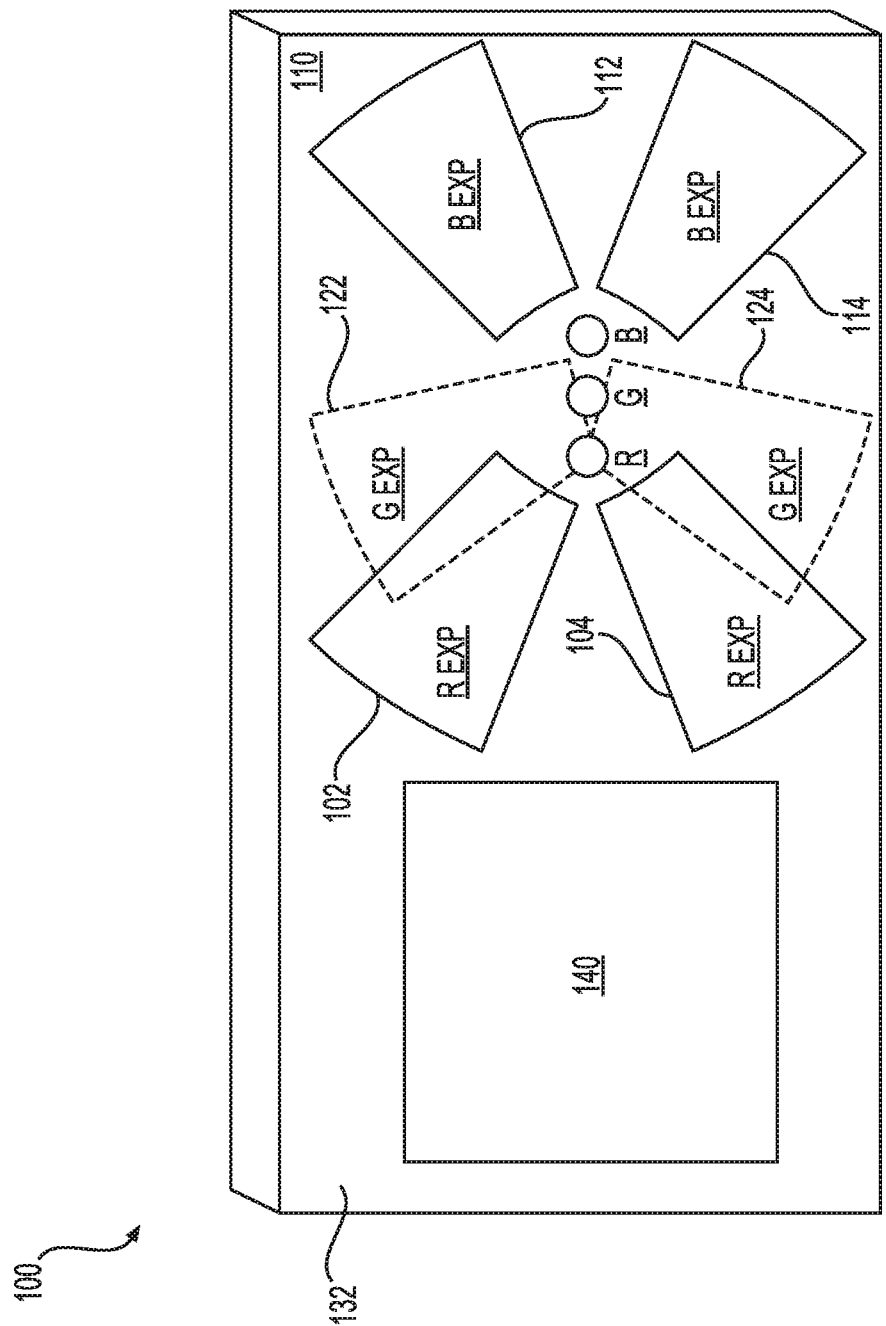

Examples described in this disclosure relate to display systems with a single plate surface relief grating (SRG). In certain examples, the display system may include a single plate SRG, display modules, such as micro-light emitting diode (micro-LED) display arrays for displaying red, green, and blue colors, and projection lenses. As an example, each display module may include a micro-LED array display and a projection lens.

HMDs with a single plate SRG waveguide may suffer from problems, such as low optical efficiency and poor color uniformity because of three design limitations. First, using a common input grating for all three colors (e.g., red, green, and blue) limits the optimal coupling of the light from the display module into the optical waveguide. This may result in poor optical efficiency which translates to higher device power consumption. This is because the efficiency of the input grating is determined by the wavelength of the light and the incident angle. Second, when using laser illumination, the bandwidth of the light for each of the colors is very narrow due to the nature of the laser device. The narrow source spectrum further limits the efficiency, but creates more substantial effects on the color uniformity as there are sharp transitions of the color uniformity in the field of view of the display. Third, when using laser sources, the pupil size generated from the display module is limited by the size of the MEMS mirrors and the relay optics. The small pupil size results in a high spatial color nonuniformity known as pupil replication. While in multi-plate designs the pupil replication may be mitigated by using double sided gratings, in the case of the single plate designs there is not enough space for the expansion gratings to be double sided.

In certain examples of the present disclosure, the display modules may be directly connected to the optical waveguide. The projection lenses may be optimized for the color. The display modules (corresponding to the red, green, and blue channels) may be slightly offset from each other so that each has its own input grating region on the optical waveguide. The expansion gratings may also be separated. There may be a common output grating. As an example, the red input grating may be on the A side of the waveguide, and the red expansion grating may also be on the A side between the input grating and the output grating. The green input grating may also be the A side, and the green expansion grating may be on the B side between the input grating and the output grating. The blue input grating may be on the A side, and the blue expansion grating may also be on the A side, but in the opposite direction of the output grating direction. In this manner, in this example, each of the colors has their own input grating and expansion grating to optimize the efficiency and the color uniformity. Separate grating regions may advantageously eliminate the possibility of cross coupling light between the gratings. As an alternative, there could be an option with two display modules: a display module for the red color channel and another one for both the blue color channel and the green color channel. This separation may be possible because the LED materials used for green color channel and the blue color channel are common on the micro-LED array and thus it would be easier to combine them. The waveguide architecture would still be similar to the example above, but the green color channel and the blue color channel would have a shared input grating region.

FIG. 1 shows a diagram of an optical waveguide 100 in accordance with one example. Optical waveguide 100 may be formed via a substrate 110. As explained later, optical waveguide may be coupled with display modules for displaying content, such as mixed-reality related content. In this example, optical waveguide 100 may be a single plate surface relief grating (SRG) waveguide. In one example, the optical waveguide may be approximately 0.5 mm thick. In this example, optical waveguide 100 may be approximately 50 mm in the horizontal direction and approximately 30 mm in the vertical direction. The three circles labeled as R, G, and B correspond to the input gratings for optical waveguide 100. In this example, each input grating may only be approximately 3 mm in diameter. Optical waveguide 100 may include two major surfaces: major surface 132, and the other major surface, which is on the other side of surface 132 in this drawing and thus is not visible.

With continued reference to FIG. 1, major surface 132 may include a first set of expansion gratings 102 and 104, and a second set of expansion gratings 112 and 114. The opposite surface may include a third set of expansion gratings 122 and 124. In this example, expansion gratings 102 and 104 may be configured to receive diffracted light from an input grating region (e.g., the input grating region labeled R) corresponding to the red color channel. Expansion gratings 112 and 114 may be configured to receive diffracted light from another input grating region (e.g., the input grating region labeled B) corresponding to the blue color channel. Expansion gratings 122 and 124 may be configured to receive diffracted light from an input grating region (e.g., the input grating region labeled G) corresponding to the green color channel. Optical waveguide 100 may further include an output grating 140, which may be configured to combine light received from each of the first set of expansion gratings (e.g., expansion gratings 102 and 104), the second set of expansion gratings (e.g., expansion gratings 112 and 114), and the third set of expansion gratings (e.g., expansion gratings 122 and 124) to generate combined light corresponding to a field of view of an apparatus incorporating optical waveguide 100 and output combined light out of optical waveguide 100 for viewing the content by a user of the apparatus. Thus, in this example, the light corresponding to the red color channel always goes through expansion gratings 102 and 104. Similarly, in this example, the light corresponding to the blue color channel always goes through expansion gratings 112 and 114 and the light corresponding to the green color channel always goes through expansion gratings 122 and 124. In this example, instead of going directly towards the output grating, the light corresponding to the blue channel may go away from the output grating and be redirected back towards the output grating by expansion gratings 112 and 114. In this example, the combined light comes out at the same location in relation to the eye of the user viewing the content. The combined light is high in brightness and yet the optical waveguide is formed using a single plate making it compact. Although FIG. 1 shows a certain number of components of optical waveguide 100 arranged in a certain manner, there could be more or fewer number of components arranged differently.

Figure 2:
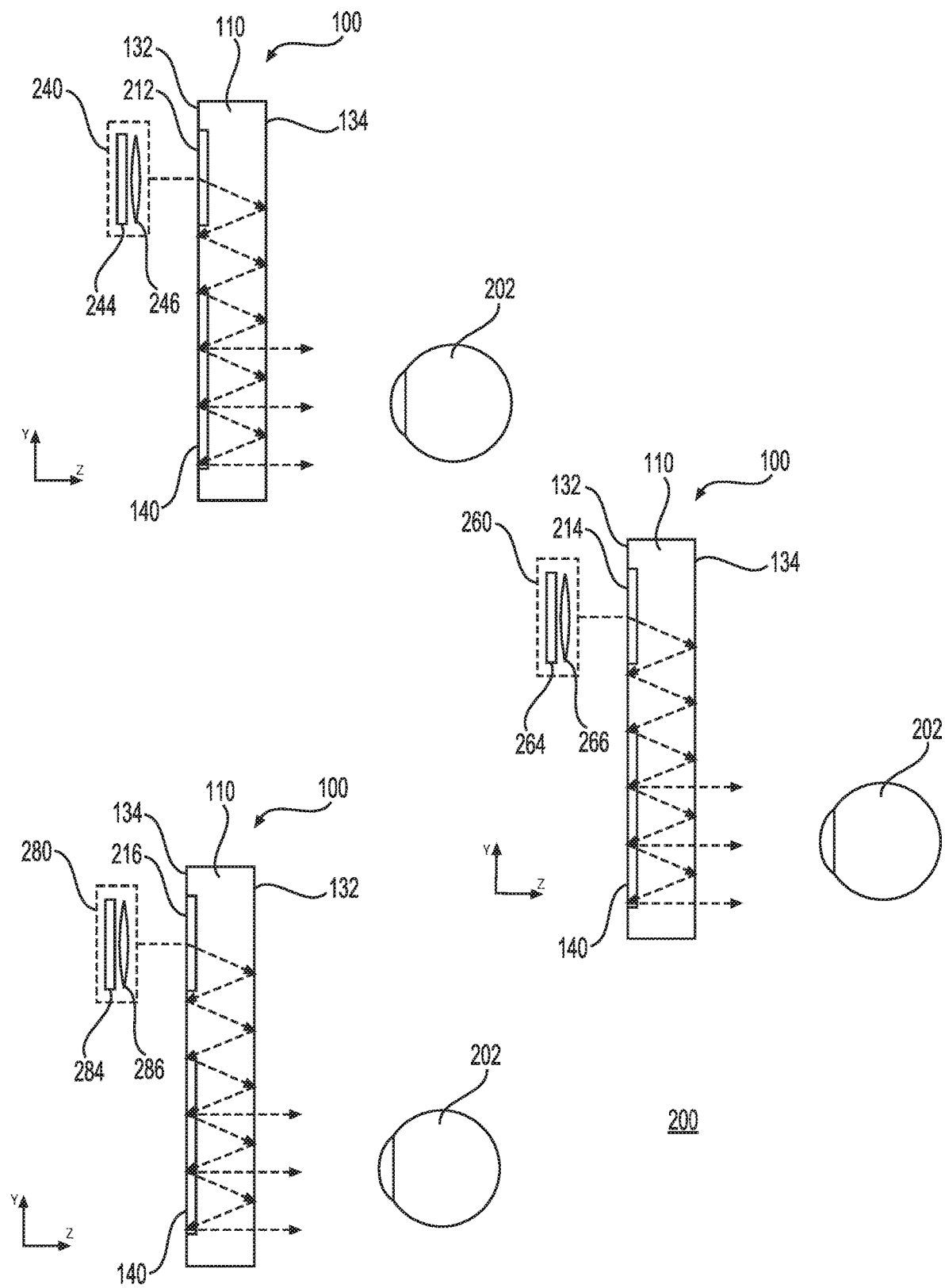
FIG. 2 shows a schematic diagram of components of a display system 200 including multiple views of optical waveguide 100 to describe operation of display system 200 in accordance with an example.

FIG. 2 shows a schematic diagram of components of a display system 200 including multiple views of optical waveguide 100 to describe operation of display system 200. Each of the three views shown in FIG. 2 corresponds to a particular color channel. As an example, the top left view corresponds to the red color channel, the middle view corresponds to the blue color channel, and the bottom left view corresponds to the green color channel. For each of these views the same reference numerals are used unless the particular aspect of the views is different either structurally or otherwise. Optical waveguide 100 may be coupled to three different display modules: display module 240 for the red color channel, display module 260 for the blue color channel, and display module 280 for the green color channel. Display module 240 may include a micro display array 244 for the red color channel and a projection lens 246, which may be optimized for the red color. Display module 260 may include a micro display array 264 for the blue color channel and a projection lens 266, which may be optimized for the blue color. Display module 280 may include a micro display array 284 for the green color channel and a projection lens 286, which may be optimized for the green color. Each projection lens may collimate the light received from the respective micro display array towards a field of view associated with the apparatus incorporating optical waveguide 100. Each projection lens may be optimized for the wavelength of the emitter. In one example, lens optimization may include changing the lens materials. In another example, lens optimization may include changing the lens curvatures. As needed, to ensure lower costs, the lens material for each projection lens may be plastic.

With continued reference to FIG. 2, light received via display module 240 may be coupled to an input grating region 212. Input grating region 212 may be configured to direct the light corresponding to the red color channel towards expansion gratings 102 and 104. Expansion gratings 102 and 104 may be configured to direct the light towards the output grating 140, which in turn may generate combined light corresponding to a field of view of an apparatus incorporating optical waveguide 100 and output combined light out of optical waveguide 100 for viewing by at least pupil 202. Light received via display module 260 may be coupled to an input grating region 214. Input grating region 214 may be configured to direct the light corresponding to the blue color channel towards expansion gratings 112 and 114. Expansion gratings 112 and 114 may be configured to direct the light towards the output grating 140, which in turn may generate combined light corresponding to a field of view of an apparatus incorporating optical waveguide 100 and output combined light out of optical waveguide 100 for viewing by at least pupil 202. In this example, input grating region 214 may be offset from the input grating region 212 to allow display module 240 to be coupled to input grating region 212 and display module 260 to be coupled to input grating region 214. The amount of offset may depend upon the physical and spatial aspects of the display modules. Light received via display module 280 may be coupled to an input grating region 216. Input grating region 216 may be configured to direct the light corresponding to the green color channel towards expansion gratings 122 and 124. Expansion gratings 122 and 124 may be configured to direct the light towards the output grating 140, which in turn may generate combined light corresponding to a field of view of an apparatus incorporating optical waveguide 100 and output combined light out of optical waveguide 100 for viewing by at least pupil 202. In this example, input grating region 216 may be offset from the input grating region 214 to allow display module 260 to be coupled to input grating region 214 and display module 280 to be coupled to input grating region 216. The amount of offset may depend upon the physical and spatial aspects of the display modules. As shown in FIG. 2, the light may travel inside optical waveguide 100 by total internal reflection.

Still referring to FIG. 2, the various gratings may be formed on the surfaces of optical waveguide 100. Alternatively, at least some or all of the gratings may be embedded in a substrate corresponding to optical waveguide 100. The gratings may be implemented as diffractive optical elements (DOEs). Each grating may include a periodic structure that can split or change a direction of any incident light. The periodic structure may be formed by varying of the surface itself, for example by forming uniform grooves in the surfaces of optical waveguide 100, where the uniform grooves may be separated by a uniform amount of spacing. Such surface relief gratings may be formed using processes such as the etching of the surfaces of optical waveguide 100 and/or the depositing of materials on the surfaces of optical waveguide 100. Such gratings may also be formed as SRGs, using a deposition process (e.g., an aluminum deposition process) and the gratings may be covered with other materials, as needed. As part of this disclosure, any gratings formed on a surface may include both "on" the surface gratings or embedded "in" the surface gratings.

With continued reference to FIG. 2, each of micro display arrays 244, 264, and 284 may be implemented as a micro-LED array. The use of separate micro display arrays for each of the red color channel, the blue color channel, and the green color channel may advantageously allow higher amounts of color uniformity and sharp transitions of color in the field of view of display system 200. Although FIG. 2 shows a certain number of components of system display 200 arranged in a certain manner, there could be more or fewer number of components arranged differently. As an example, although FIG. 2 shows display modules 240, 260, and 280 arranged on an opposite side of a side where pupil 202 is shown, they may be arranged on the same side as the side where pupil 202 is shown. Thus, display system need not be configured in periscope mode, and could be configured in a mirror mode.

Figure 3:
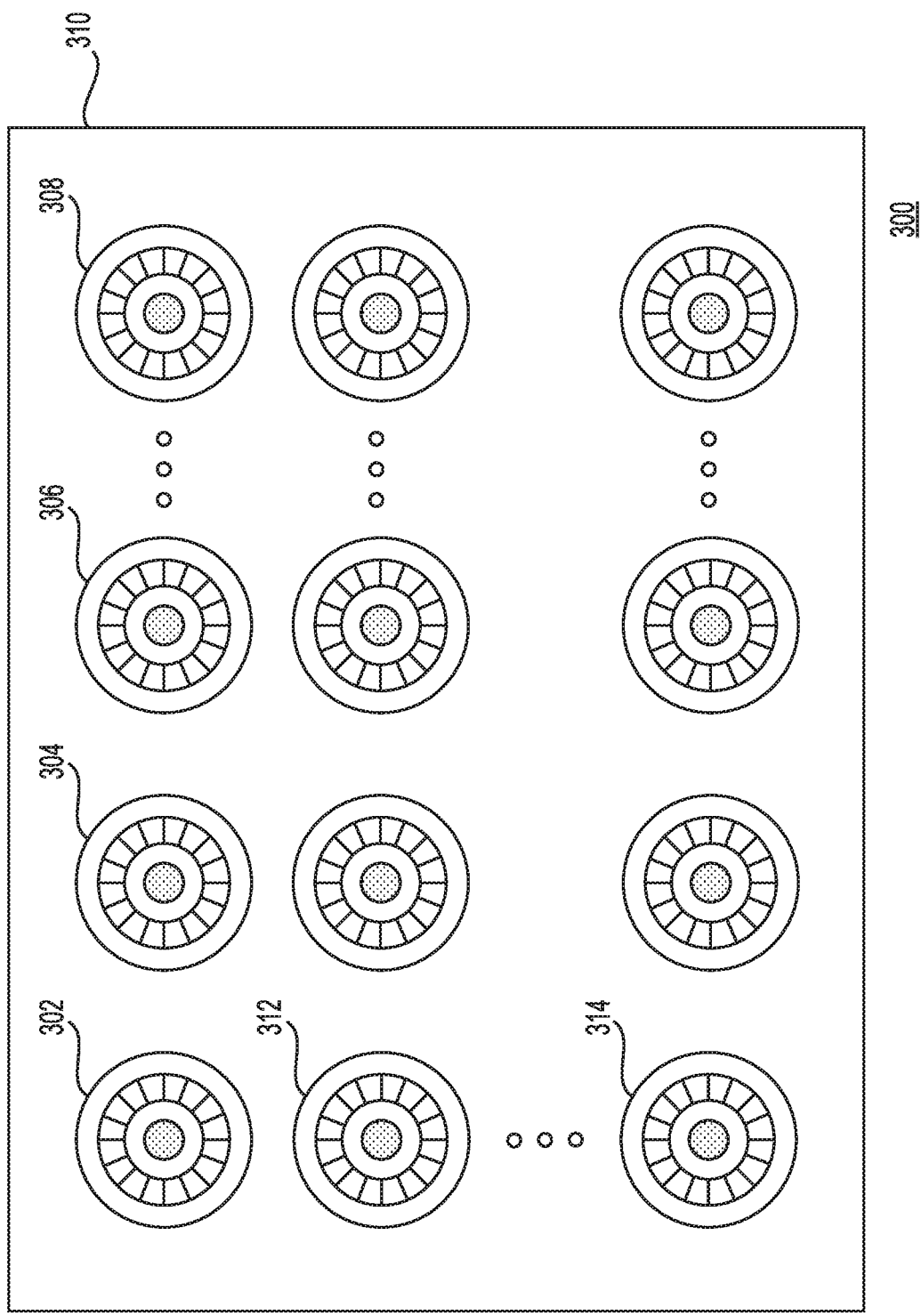
FIG. 3 shows a schematic diagram of an example micro display array for use with the display system of FIG. 2.

FIG. 3 shows a schematic diagram of an example micro display array 300 for use with display system 200. As explained earlier, each micro display may be specifically tailored to a particular color. Micro display array 300 may be formed on a substrate 310 using semiconductor wafer processing techniques. In this example, micro display array 300 may comprise an array of light-emitting diodes (LEDs) arranged in rows and columns. As an example, the top row may include micro-LEDs 302, 304, 306, and 308 and the left most column may include micro-LEDs 302, 312, and 314. As an example, each micro-LED may correspond to a pixel displayed to the user in the field of view of display system 200. In this example, micro display array 300 and neighboring micro-LEDs may be separated by a pitch that is less than 5 microns. In another example, the pitch may be in a range between 2.5 microns to 5 microns. The use of micro-LEDs may allow higher brightness as well because of they are emissive unlike other display technologies. The higher brightness may be particularly advantageous in use with optical waveguide 100, which may be optically inefficient. In addition, advantageously, unlike laser sources, which are narrow light sources, micro-LEDs are broad spectrum light sources. The broader spectrum of light emitted by these micro-LEDs may overcome inefficiencies of light transmission through the optical waveguide.

With continued reference to FIG. 3, micro display array 300 may be configured with a different number of pixels depending upon the color channel. As an example, the micro display array for the green color channel may be configured to have the highest number of pixels per degree. In one example, the micro display array for the green color channel may have as many as 60 pixels per degree. On the other hand, the micro display arrays for the red color channel and the blue color channel may be configured to have a relatively lower number of pixels per degree. In one example, the micro display arrays for these colors may have as few as 15 pixels per degree. By configuring the number of pixels per degree for each color channel, one may advantageously save power since the red color channel and the blue color channel may not require as many pixels per degree as the green color channel.

Figure 4:
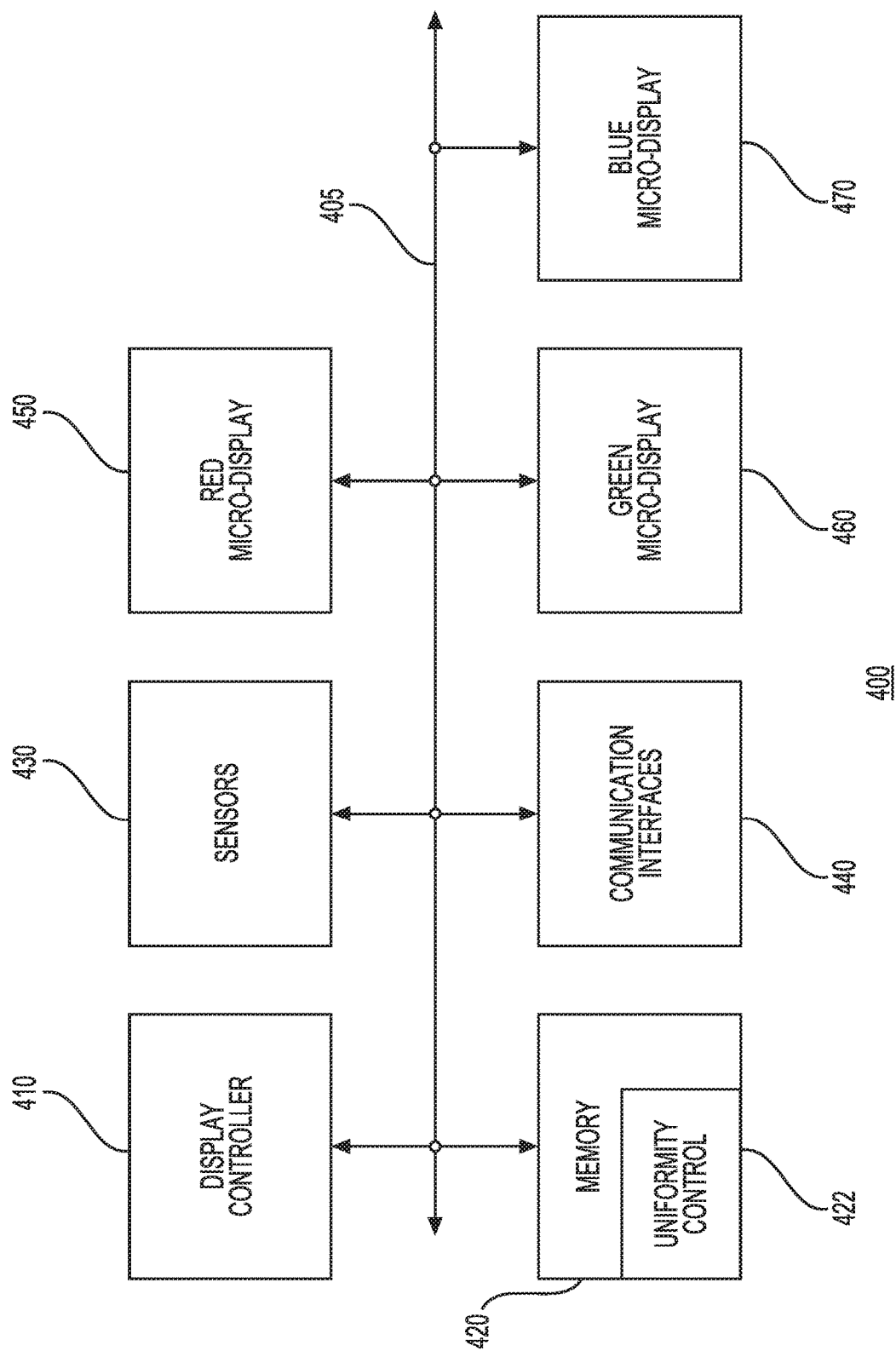
FIG. 4 shows a block diagram of a system corresponding to the display system of FIG. 2 in accordance with one example.

FIG. 4 shows a block diagram of a system 400 corresponding to display system 200. System 400 may include a display controller 410, memory 420, sensors 430, communication interfaces 440, red micro-display interface 450, green micro-display interface 460, and blue micro-display interface 470, each of which may be coupled via a bus 405. Memory 420 may further include instructions organized in the form of modules, including instructions related to uniformity control 422. Uniformity control 422 may include instructions and data structures corresponding to generating a uniformity control signal that may be used to independently adjust a uniformity of color for each of the red color channel, the blue color channel, and the green color channel. In one example, uniformity control 422 may include instructions for calibrating color uniformity independently for each of these color channels. The calibration process may be performed at various stages: during final testing of an apparatus, at periodic intervals, during powering up of the apparatus, in response to a request from another instruction module associated with the apparatus, in response to a user request, user command, or user input, or in response to a mechanical shock to the apparatus. Sensors 430 may include an accelerometer or a similar sensor to detect any mechanical shocks (e.g., a shock caused by a user inadvertently dropping the apparatus incorporating optical waveguide 100). As part of the calibration process, display controller 400 may initiate a series of steps that may include powering up each micro display array sequentially and sensing at least a portion of the light generated by the respective micro display array using sensors 430 (e.g., photosensors) to assess a uniformity of the color. Although FIG. 4 shows a certain number of components of system 400 arranged in a certain manner, there could be more or fewer number of components arranged differently.

Optical waveguide 100 and display systems described earlier can be incorporated into a see-through mixed reality display system. Separate optical waveguides 100 and related components can also be provided for each of the left and right eyes of a user. Such optical waveguides may be positioned next to or between see-through lenses, which may be standard lenses used in eye glasses or prescription lenses. The mixed reality display system may also be implemented as a head-mounted display (HMD) glasses including a frame.

FIG. 5 shows a flow chart 500 showing steps of a method related to an apparatus incorporating optical waveguide 100 and display system 200 in accordance with one example. Step 510 may include coupling: a first light portion received from a first micro display array to a first input grating region of an optical waveguide, a second light portion received from a second micro display array to a second input grating region of the optical waveguide, and a third light portion received from a third micro display array to a third input grating region of the optical waveguide. In one example, this step may be performed using optical waveguide 100 and display system 200 as per control instructions received from display controller 410. Additional details regarding the coupling of the light portions are described with respect to FIGS. 1-4.

Step 520 may include directing: a first diffracted portion of the first light portion to a first expansion grating, a second diffracted portion of the second light portion to a second expansion grating, and a third diffracted portion of the third light portion to a third expansion grating. In one example, this step may be performed using optical waveguide 100 and display system 200 as per control instructions received from display controller 410. Thus, for example as descried with respect to FIG. 1 earlier, expansion gratings 102 and 104 may be configured to receive diffracted light from an input grating region (e.g., the input grating region labeled R) corresponding to the red color channel. Expansion gratings 112 and 114 may be configured to receive diffracted light from another input grating region (e.g., the input grating region labeled B) corresponding to the blue color channel. Expansion gratings 122 and 124 may be configured to receive diffracted light from an input grating region (e.g., the input grating region labeled G) corresponding to the green color channel. Additional details regarding this step are described with respect to FIGS. 1-4.

Step 530 may include using a single output grating combining light received from each of the first expansion grating, the second expansion grating, and the third expansion grating, and outputting combined light corresponding to a field of view of an apparatus incorporating the optical waveguide. In one example, this step may be performed using optical waveguide 100 and display system 200 as per control instructions received from display controller 410. As an example, as described earlier, an output grating 140 may be configured to combine light received from each of the first set of expansion gratings (e.g., expansion gratings 102 and 104), the second set of expansion gratings (e.g., expansion gratings 112 and 114), and the third set of expansion gratings (e.g., expansion gratings 122 and 124) to generate combined light corresponding to a field of view of an apparatus incorporating optical waveguide 100 and output combined light out of optical waveguide 100 for viewing the content by a user of the apparatus. Additional details regarding this step are described with respect to FIGS. 1-4.

Step 540 may include, in response to at least one uniformity control signal, using a controller associated with the apparatus, adjusting independently at least one of: a first display parameter related to a first set of pixels corresponding to the first micro display array, a second display parameter related to a second set of pixels corresponding to the second micro display array, or a third display parameter related to a third set of pixels corresponding to the third micro display array to at least improve a uniformity of the combined light. In this example, the display parameter may relate to a brightness of the color in the field of view. Thus, in one example, the lack of color uniformity may relate to higher brightness of the color in and around the center of the field of view, but lower brightness of the color at or near the periphery of the field of view. In one example, display controller 410, after the calibration process, as described with respect to FIG. 4, may adjust the brightness of each pixel for the micro display array that requires the adjustment. This adjustment may be performed independently for each of the micro display arrays corresponding the red color channel, the blue color channel, and the green color channel. In one example, display controller 410 may store in memory 420 as part of uniformity control 422 bits corresponding to each pixel that allow brightness control for each pixel. Thus, a certain number of bits (e.g., two out of eight bits) available for control of each pixel may be used to control the brightness of that particular pixel on a particular micro display array. The steps described with respect to FIG. 5 need not be performed in a certain order and additional or fewer steps may be performed.

In conclusion, the present disclosure relates to an apparatus comprising a first micro display array corresponding to a red color channel, a second micro display array corresponding to a green color channel, and a third micro display array corresponding to a blue color channel. The apparatus may further include an optical waveguide including a first surface and a second surface opposite to the first surface. The optical waveguide may further include a first input grating region configured to receive a first light portion corresponding to the red color channel, a second input grating region configured to receive a second light portion corresponding to the blue color channel, where the second input grating region is offset from the first input grating region by a first offset, and a third input grating region configured to receive a third light portion corresponding to the green color channel, where the third input grating region is offset from the second input grating region by a second offset.

The optical waveguide may further include a first set of expansion gratings, formed on the first major surface of the optical waveguide, configured to receive a first diffracted light portion of the first light portion from the first input grating region, a second set of expansion gratings, formed on the first major surface of the optical waveguide, configured to receive a second diffracted light portion of the second light portion from the second input grating region, and a third set of expansion gratings, formed on the second major surface of the optical waveguide, configured to receive a third diffracted light portion of the third light portion from the third input grating region.

The apparatus may further include a first projection lens coupled to the first micro display array, a second projection lens coupled to the second micro display array, and a third projection lens coupled to the third micro display array. The apparatus may further include an output grating configured to combine light received from each of the first set of expansion gratings, the second set of expansion gratings, and the third set of expansion gratings to generate combined light corresponding to a field of view of the apparatus and output combined light out of the optical waveguide. The optical waveguide may be a single plate surface reflective grating.

In one example of the apparatus, the first input grating region may be arranged in an opposite direction to the second input grating region. Each of first micro display array, the second micro display array, and the third micro display array may comprise a micro-LED array. The apparatus may further include a display controller configured to independently adjust at least one of: a first display parameter related to a first set of pixels corresponding to the first micro display array, a second display parameter related to a second set of pixels corresponding to the second micro display array, or a third display parameter related to a third set of pixels corresponding to the third micro display array to at least improve a uniformity of the combined light.

In another example, the present disclosure relates to an apparatus comprising a first micro display array corresponding to a red color channel, a second micro display array corresponding to a green color channel, and a third micro display array corresponding to a blue color channel. The apparatus may further include an optical waveguide including a first surface and a second surface opposite to the first surface. The optical waveguide may further include a first input grating region configured to receive a first light portion corresponding to the red color channel, a second input grating region configured to receive a second light portion corresponding to the blue color channel, where the second input grating region is offset from the first input grating region by a first offset, and a third input grating region configured to receive a third light portion corresponding to the green color channel, where the third input grating region is offset from the second input grating region by a second offset.

The optical waveguide may further include a first expansion grating, formed on the first major surface of the optical waveguide, configured to receive a first diffracted light portion of the first light portion from the first input grating region, a second expansion grating, formed on the first major surface of the optical waveguide, configured to receive a second diffracted light portion of the second light portion from the second input grating region, and a third expansion grating, formed on the second major surface of the optical waveguide, configured to receive a third diffracted light portion of the third light portion from the third input grating region. The optical waveguide may further include an output grating configured to combine light received from each of the first expansion grating, the second expansion grating, and the third expansion grating to generate combined light corresponding to a field of view of the apparatus and output combined light out of the optical waveguide.

The apparatus may further include a first projection lens coupled to the first micro display array, a second projection lens coupled to the second micro display array, and a third projection lens coupled to the third micro display array. The optical waveguide may be a single plate surface reflective grating.

In one example of the apparatus, the first input grating region may be arranged in an opposite direction to the second input grating region. Each of first micro display array, the second micro display array, and the third micro display array may comprise a micro-LED array. The apparatus may further include a display controller configured to independently adjust at least one of: a first display parameter related to a first set of pixels corresponding to the first micro display array, a second display parameter related to a second set of pixels corresponding to the second micro display array, or a third display parameter related to a third set of pixels corresponding to the third micro display array to at least improve a uniformity of the combined light.

In another example, the present disclosure relates to a method in an apparatus comprising a display controller, an optical waveguide, a first micro display array, a second micro display array, and a third micro display array. The method may include coupling: a first light portion received from the first micro display array to a first input grating region of the optical waveguide, a second light portion received from the second micro display array to a second input grating region of the optical waveguide, and a third light portion received from the third micro display array to a third input grating region of the optical waveguide. The method may further include directing: a first diffracted portion of the first light portion to a first expansion grating, a second diffracted portion of the second light portion to a second expansion grating, and a third diffracted portion of the third light portion to a third expansion grating. The method may further include using a single output grating combining light received from each of the first expansion grating, the second expansion grating, the third expansion grating, and outputting combined light corresponding to a field of view of an apparatus incorporating the optical waveguide. The method may further include, in response to at least one uniformity control signal, using a controller associated with the apparatus, adjusting independently at least one of: a first display parameter related to a first set of pixels corresponding to the first micro display array, a second display parameter related to a second set of pixels corresponding to the second micro display array, or a third display parameter related to a third set of pixels corresponding to the third micro display array to at least improve a uniformity of the combined light.

The method may further include using a first projection lens coupled to the first micro display array, collimating a first emitted light portion from the first micro display array onto the first input grating region, using a second projection lens coupled to the second micro display array, collimating a second emitted light portion from the second micro display array onto the second input grating region, and using a third projection lens coupled to the third micro display array, collimating a third emitted light portion from the third micro display array onto the third input grating region.

The optical waveguide may be a single plate surface reflective grating. The method may further include rendering the collected light into content for display in the field of view of the apparatus incorporating the optical waveguide. The optical waveguide may include a first major surface and a second major surface opposite to the first major surface, where the first expansion grating is formed on the first major surface of the optical waveguide, where the second expansion grating is formed on the first major surface of the optical waveguide, and where the third expansion grating is formed on the second major surface of the optical waveguide.

Each of the first micro display array, the second micro display array, and the third micro display array may comprise a micro-LED array. The method may further include calibrating color uniformity independently for each of the first micro display array, the second micro display array, and the third micro display array.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:
1. An apparatus comprising:
    an optical waveguide including a first surface and a second surface opposite to the first surface, the optical waveguide further comprising:

a first input grating region configured to receive a first light portion corresponding to a red color channel, a second input grating region configured to receive: (1) a second light portion corresponding to a blue color channel and (2) a third light portion corresponding to a green color channel, wherein the second input grating region is offset from the first input grating region by a first offset, a first set of expansion gratings, formed on the first major surface of the optical waveguide, configured to receive a first diffracted light portion of the first light portion from the first input grating region, a second set of expansion gratings, formed on the first major surface of the optical waveguide, configured to receive a second diffracted light portion of the second light portion from the second input grating region, and a third set of expansion gratings, formed on the second major surface of the optical waveguide, configured to receive a third diffracted light portion of the third light portion from the second input grating region.

2. The apparatus of claim 1 further comprising a first projection lens coupled to a first micro display array corresponding to the red color channel, a second projection lens coupled to a second micro display array corresponding to the blue color channel, and a third projection lens coupled to a third micro display array corresponding to the green color channel.

3. The apparatus of claim 1 further comprising an output grating configured to combine light received from each of the first set of expansion gratings, the second set of expansion gratings, and the third set of expansion gratings to generate combined light corresponding to a field of view of the apparatus and output combined light out of the optical waveguide.

4. The apparatus of claim 1, wherein the optical waveguide is a single plate surface reflective grating.

5. The apparatus of claim 1, wherein the first input grating region is arranged in an opposite direction to the second input grating region.

6. The apparatus of claim 2, wherein each of the first micro display array, the second micro display array, and the third micro display array comprises a micro-LED array.

7. The apparatus of claim 2 further comprising a display controller configured to independently adjust at least one of: a first display parameter related to a first set of pixels corresponding to the first micro display array, a second display parameter related to a second set of pixels corresponding to the second micro display array, or a third display parameter related to a third set of pixels corresponding to the third micro display array to at least improve a uniformity of the combined light.

8. An apparatus comprising:
an optical waveguide including a first surface and a second surface opposite to the first surface, the optical waveguide further comprising:
a first input grating region configured to receive a first light portion corresponding to a red color channel,
a second input grating region configured to receive: (1) a second light portion corresponding to a blue color channel and (2) a third light portion corresponding to a green color channel, wherein the second input grating region is offset from the first input grating region by a first offset,
a first expansion grating, formed on the first major surface of the optical waveguide, configured to receive a first diffracted light portion of the first light portion from the first input grating region,
a second expansion grating, formed on the first major surface of the optical waveguide, configured to receive a second diffracted light portion of the second light portion from the second input grating region,
a third expansion grating, formed on the second major surface of the optical waveguide, configured to receive a third diffracted light portion of the third light portion from the second input grating region, and
an output grating configured to combine light received from each of the first expansion grating, the second expansion grating, and the third expansion grating to generate combined light corresponding to a field of view of the apparatus and output combined light out of the optical waveguide.

9. The apparatus of claim 8 further comprising a first projection lens coupled to a first micro display array corresponding to the red color channel, a second projection lens coupled to a second micro display array corresponding to the blue color channel, and a third projection lens coupled to a third micro display array corresponding to the green color channel.

10. The apparatus of claim 8, wherein the optical waveguide is a single plate surface reflective grating.

11. The apparatus of claim 8, wherein the first input grating region is arranged in an opposite direction to the second input grating region.

12. The apparatus of claim 9, wherein each of the first micro display array, the second micro display array, and the third micro display array comprises a micro-LED array.

13. The apparatus of claim 9 further comprising a display controller configured to adjust independently at least one of: a first display parameter related to a first set of pixels corresponding to the first micro display array, a second display parameter related to a second set of pixels corresponding to the second micro display array, or a third display parameter related to a third set of pixels corresponding to the third micro display array to at least improve a uniformity of the combined light.

14. A method in an apparatus comprising a display controller, an optical waveguide, a first micro display array, a second micro display array, and a third micro display array, the method comprising:
coupling: a first light portion received from the first micro display array to a first input grating region of the optical waveguide, a second light portion received from the second micro display array to a second input grating region of the optical waveguide, and a third light portion received from the third micro display array to the second input grating region of the optical waveguide;
directing: a first diffracted portion of the first light portion to a first expansion grating, a second diffracted portion of the second light portion to a second expansion grating, and a third diffracted portion of the third light portion to a third expansion grating;
using a single output grating combining light received from each of the first expansion grating, the second expansion grating, the third expansion grating, and outputting combined light corresponding to a field of view of an apparatus incorporating the optical waveguide; and
in response to at least one uniformity control signal, using a controller associated with the apparatus, adjusting independently at least one of: a first display parameter related to a first set of pixels corresponding to the first micro display array, a second display parameter related to a second set of pixels corresponding to the second micro display array, or a third display parameter related to a third set of pixels corresponding to the third micro display array to at least improve a uniformity of the combined light.

15. The method of claim 14 further comprising: using a first projection lens coupled to the first micro display array, collimating a first emitted light portion from the first micro display array onto the first input grating region, using a second projection lens coupled to the second micro display array, collimating a second emitted light portion from the second micro display array onto the second input grating region, and using a third projection lens coupled to the third micro display array, collimating a third emitted light portion from the third micro display array onto the second input grating region.

16. The method of claim 14, wherein the optical waveguide is a single plate surface reflective grating.

17. The method of claim 14 further comprising rendering the collected light into content for display in the field of view of the apparatus incorporating the optical waveguide.

18. The method of claim 14, wherein the optical waveguide comprises a first major surface and a second major surface opposite to the first major surface, wherein the first expansion grating is formed on the first major surface of the optical waveguide, wherein the second expansion grating is formed on the first major surface of the optical waveguide, and wherein the third expansion grating is formed on the second major surface of the optical waveguide.

19. The method of claim 14, wherein each of the first micro display array, the second micro display array, and the third micro display array comprises a micro-LED array.

20. The method of claim 14 further comprising calibrating color uniformity independently for each of the first micro display array, the second micro display array, and the third micro display array.

* * * * *